United States Patent Office 3,657,310
Patented Apr. 18, 1972

3,657,310
PROCESS FOR MAKING ALIPHATIC
CARBONATE ESTERS
Ludo K. Frevel, Midland, Mich., assignor to The Dow
Chemical Company, Midland, Mich.
No Drawing. Filed Aug. 14, 1969, Ser. No. 850,215
Int. Cl. C07c 67/00, 67/02, 69/00
U.S. Cl. 260—463          5 Claims

ABSTRACT OF THE DISCLOSURE

Esters of the formula $$ROCOO(AO)_nR'$$

wherein R and R' are monovalent aliphatic radicals, A is an alkylene radical of 2–4 carbon atoms and $n$ is an integer at least 1, are made by
(1) Reacting an alkali metal bicarbonate ester with methyl chloride, bromide or iodide:

$$ROCOOM + CH_3X \rightarrow ROCOOCH_3 + MX$$

wherein M is alkali metal and X is Cl, Br or I, and
(2) Reacting the above methyl ester with a monoether of an alkylene glycol or polyglycol:

$$ROCOOCH_3 + HO(AO)_nR' \rightarrow ROCOO(AO)_nR' + CH_3OH$$

In a preferred process, step 1 is conducted in the presence of the glycol ether, thus combining the two steps.

BACKGROUND OF THE INVENTION

Dialkyl carbonates have been made by the reaction of an alcohol with phosgene and by the reaction of $K_2CO_3$ with alkyl halide (Fukui et al., C.A., 58, 2366).
Certain glycol ether carbonates have been described by Drake et al., J.A.C.S., 52, 3720.

CROSS-REFERENCES TO RELATED APPLICATIONS

My copending application with David F. Gransden, Ser. No. 784,266, filed Dec. 16, 1968 discloses the preparation of certain glycol ether carbonates by the alcoholysis of diethyl carbonate.

My copending application with Jo Ann Gilpin, Ser. No. 798,765, filed Feb. 12, 1969, discloses the preparation of certain glycol ether carbonates by alcoholysis of cyclic alkylene carbonates.

SUMMARY OF THE INVENTION

Carbonate esters of the formula $$ROCOO(AO)_nR'$$

are made by:
(1) Reacting an alkali metal bicarbonate ester with methyl chloride, bromide or iodide:

$$ROCOOM + CH_3X \rightarrow ROCOOCH_3 + MX$$

and
(2) Reacting the methyl ester produced in step (1) with a monoether of an alkylene glycol or polyalkylene glycol:

$$ROCOOCH_3 + HO(AO)_nR' \rightarrow ROCOO(AO)_nR' + CH_3OH$$

wherein, in all the above formulas, R is lower alkyl or —(AO)$_n$R', and R' is lower alkyl, i.e., up to about 6 carbon atoms, X is Cl, Br or I, M is an alkali metal, A is an alkylene radical of 2–4 carbon atoms and $n$ is an integer at least 1 and may be as much as 5 or more.

As will be shown hereinafter, the above two steps can be combined into a single step.

Carbonates of the above type are useful as lubricants and hydraulic fluids, and as plasticizers for vinyl resins, ethylcellulose, and other synthetic resins.

DETAILED DESCRIPTION OF THE INVENTION

The starting materials used in the invention, the ester-salts of the formula ROCOOM, are of a well-known class and are conveniently made by the reaction of $CO_2$ with the appropriate alkali metal alcoholate, ROM. The latter is readily made by reaction of the alcohol, ROH, with alkali metal or with the hydroxide, alkoxide or amide of an alkali metal. Techniques for conducting these reactions are well known. In a preferred process, at least a one molar excess of alcohol is used to make the alcoholate. The resulting alcohol solution of alcoholate, with or without dilution with inert solvent, is then reacted with $CO_2$ to make the carbonate ester-salt. The alcoholic solution or dispersion of ester-salt is then reacted with methyl chloride, bromide or iodide to produce, at least transiently, the methyl ester, ROCOOCH$_3$. The latter then reacts with the excess alcohol to produce the desired ester, thus effectively combining the methylation and transesterification steps.

The alkali metal may be Li, Na, K, Rb, or Cs, the preferred ones being Na and K.

The alcohol, ROH, may be an alkanol, preferably a lower alkanol (up to about 6 carbon atoms) or a monoether of a glycol or polyglycol having the formula $$R'(OA)_nOH$$

wherein R', A and $n$ are as defined above. Examples of suitable such alcohols include methanol, butanol, hexanol, 2-ethylbutanol, isobutanol, 2-methoxyethanol, 2-butoxyethanol, 1-isobutoxy-2-propanol, the monomethyl, ethyl, butyl and hexyl ethers of di-, tri-, tetra- and pentaethylene, -propylene and -butylene glycols.

The glycol or polyglycol monoether used in the last step of the process may be any of those defined above having the formula R'(OA)$_n$OH.

The reaction of the ester-salt with the methyl halide is conveniently conducted at about 100°–170° C. and under at least the autogenous pressure of the reaction mixture. The reaction time may vary widely, depending on temperature and reactants, but is ordinarily about 1–10 hr.

The proportion of methyl halide to ester-salt is not critical, though as a practical matter at least a molar equivalent should be used.

In the transesterification reaction, at least a molar equivalent of the alcohol, R'(OA)$_n$OH, should be used to insure substantial reaction. Removal of the by-product methanol also favors completion of the reaction. When the alcohol corresponds to the R of the methyl ester, i.e., when R is the same as R(OA)$_n$—, the final product is a symmetrical ester and a large excess of alcohol in the transesterification can do no harm. However, when the final product is to be an unsymmetrical ester, the use of a large excess of alcohol will tend to displace not only the methyl group of the intermediate ester but also the R group thereof, thus producing the symmetrical ester R'(OA)$_n$OCO(OA)$_n$R'. The formation of this by-product ester can be largely suppressed by (1) using only the stoichiometric amount or only a slight excess of alcohol in the transesterification and (2) terminating the reaction no later than when substantially the calculated amount of methanol has been produced.

While some transesterification goes on during the methylation reaction, it is usually desirable to raise the temperature and/or remove methanol as formed in order to complete this step after methylation is complete. Temperatures of 125°–170° C. are generally preferred. No additional catalyst is necessary under these conditions. For most purposes the residual catalyst should be separated from the product before the latter is used.

While the above reactions can be conducted without use of inert solvent, especially when a substantially excess of alcohol is used, it is preferred to use enough solvent to fluidize the reaction mixture and serve as a dispersing medium for the insoluble salts. Suitable such solvents include hydrocarbons, such as petroleum ether, kerosine, benzene, toluene and xylene; ethers such as diisopropyl ether, tetrahydrofuran, dioxane, the dimethyl ethers of ethylene glycol and diethylene glycol and the like.

SPECIFIC EMBODIMENTS

The following examples illustrate the practice of the invention.

EXAMPLE 1

Dimethyl carbonate

Metallic sodium (0.35 g., 0.015 m.) was dissolved in 3.21 g., 0.1 m., of methanol. The solution was cooled to —80° C. and 2 g. of $CO_2$ was added. The container was sealed and heated at 100° C. for 1 hr. The excess $CO_2$ was then vented and 1.56 g. (0.031 m.) of $CH_3Cl$ was added, the container was sealed and heated 2 hr. at 150° C. The reactor was then cooled and the excess $CH_3Cl$ (1.31 g.) was distilled off, leaving a methanolic solution of the product, the composition of which was determined by infrared absorption. Excluding the methanol, it contained 92% of dimethyl carbonate.

EXAMPLE 2

Bis(2-(2-methoxyethoxy)ethyl) carbonate

Metallic sodium (0.6 g., 0.026 m.) was dissolved in 11.87 g., 0.1 m. of 2(2-methoxyethoxy)ethanol. To the resulting solution was added 1.10 g. of $CO_2$ at 25° C. and 5 p.s.i.g. The resulting thick slurry was diluted with 1.7 g. of $CH_3Cl$, sealed, and heated at 150° C. for 4 hr. in a rocker bomb. The mixture was then cooled, the solids removed, and the liquid analyzed and found to contain 3.29 g. (25%) of bis(2(2-methoxyethoxy)ethyl) carbonate, this being a 48% yield, based on the sodium used. Distillation of the more volatile components left a residue of 3.57 g. which analyzed to be 96% pure desired carbonate.

EXAMPLE 3

Bis(2-(2-methoxyethoxy)ethyl) carbonate

A stirred reactor was charged with a solution of 40 g., 1 m., of NaOH in 40 g. of water, 320 g. of toluene and 360 g. (3 m.) of 2(2-methoxyethoxy)ethanol. Water-toluene azeotrope was distilled at atmospheric pressure over a period of 3.5 hr., thereby removing 57.7 g. of water, 142 g. of toluene and 2.3 g. of the alcohol. The sodium salt was then carbonated with 43 g. of $CO_2$ to yield the sodium bicarbonate ester of 2(2-methoxyethoxy)ethanol.

A portion (64 g.) of the slurry thus obtained containing 0.11 m. of sodium 2(2-methoxyethoxy)ethyl carbonate was transferred to a glass ampoule and $CH_3Br$ (12.75 g.) was added. The ampoule was sealed and heated at 100° C. for 10 hr. in a rocking bomb. The ampoule was cooled and opened and the liquid contents after separation of NaBr were distilled to produce 13.4 g. of the desired carbonate.

I claim:
1. The process comprising
    (a) reacting a compound of the formula

with methyl chloride, bromide or iodide, thus to produce a methyl ester of the formula

and
   (b) reacting the methyl ester with an alcohol of the formula

thus to produce an ester of the formula

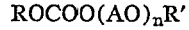

where in all the above formulas, R is lower alkyl or —$(AO)_nR'$, R' is lower alkyl, A is an alkylene radical of 2–4 carbon atoms, M is an alkali metal and $n$ is an integer 1–5.

2. The process of claim 1 wherein step (a) is conducted in the presence of the alcohol $HO(AO)_nR'$, thus combining steps (a) and (b) into a single unit process.
3. The process of claim 1 wherein A is ethylene.
4. The process of claim 1 wherein $n$ is 2.
5. The process of claim 1 wherein R' is methyl.

References Cited

UNITED STATES PATENTS

| | | | |
|---|---|---|---|
| 2,784,201 | 3/1957 | Chitwood | 260—340.2 |
| 2,983,749 | 5/1961 | Shepherd | 260—463 |
| 2,651,657 | 9/1953 | Mikeska et al. | 260—463 |

LEWIS GOTTS, Primary Examiner

D. G. RIVERS, Assistant Examiner